Patented Mar. 28, 1933

1,902,929

UNITED STATES PATENT OFFICE

KARL ZAHN, OF FRANKFORT-ON-THE-MAIN-HOCHST, GERMANY, ASSIGNOR TO GENERAL ANILINE WORKS, INC., OF NEW YORK, N. Y., A CORPORATION OF DELAWARE

CONDENSATION PRODUCT OF ISATIN-α-ANILIDE AND SUBSTITUTED ANTHRONES AND PROCESS OF PRODUCING SAME

No Drawing. Application filed June 4, 1930, Serial No. 459,260, and in Germany July 16, 1929.

My present invention relates to condensation products of isatin-alpha-anilide and substituted anthrones and process of producing same.

I have found that the reduction products of acetylated 1.4-dihydroxy-anthraquinones, obtainable for instance by the reduction of 1.4 diacetyloxy-anthraquinones in an acetic acid suspension with hydrosulfite and having the general formula:

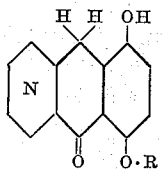

wherein the nucleus N may contain substituents and R represents an acetyl group, can be etherified in one hydroxyl group, the acetyl group being split off by treating the compounds for a short time with an aliphatic alcohol in the presence of a mineral acid as, for instance, hydrochloric acid or sulfuric acid. This reaction occurs with a surprising facility hitherto not observed with hydroxy derivatives of the anthrone series.

Instead of the above mentioned reduction-products of acetylated 1.4-di-hydroxy-anthraquinones there also may be used as starting materials the corresponding 1.4-dihydroxyanthrones obtainable by saponification of the said acetylated products.

I have further found that the ethers thus obtained of the following general formula:

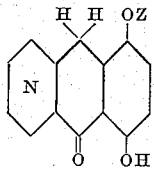

wherein the nucleus N may contain substituents and Z stands for alkyl can be condensed with an isatin-α-derivative as, for example, an isatin-α-anilide whereby valuable greenish blue to green vat dyestuffs are obtained. This reaction could not be foreseen, as it was found out that not all of the α-hydroxyanthrones can be condensed with isatin-α-derivatives. Thus, for example, the reduction products of 1-acetoxy-anthraquinone and the 1.8-diacetoxy-anthraquinone are not condensable with isatin-α-anilide.

Hitherto it was only known that the reduction product of 1-hydroxyanthraquinone can be condensed with isatin-α-derivatives so as to form vat dyestuffs (see U. S. Patent Specification No. 1,025,174 dated May 7th, 1912 in the name of Robert Welde and Benno Homolka).

In comparison with these vat dyestuffs, the tints of the dyestuffs obtainable according to the process of the present application are much greener. The new dyestuffs have, moreover, excellent fastness properties and correspond to the following general formula:

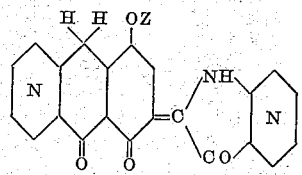

wherein the nuclei N may contain substituents and Z represents an alkyl group.

The following examples illustrate the invention, the parts being by weight:

(1) 54 parts of 1-hydroxy-4 acetoxy-10-anthrone of the formula:

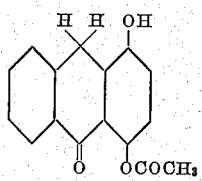

(obtainable by reducing diacetyl-quinizarine in an acetic acid suspension with sodium-hydrosulfite) are heated to boiling in a reflux apparatus with 500 parts of methanol and 100 parts of concentrated hydrochloric acid. The starting material gradually passes into solution with a yellowish-brown coloration and after a short time the separation of the reaction product begins in the form of yellow needles. Boiling is continued for some time and after cooling, the entire mixture is filtered by suction. When recrystallizing the product from glacial acetic acid, the pure monomethylether of 1.4-dihydroxy-anthrone is obtained, melting at 156° C. to 157° C. and having the formula:

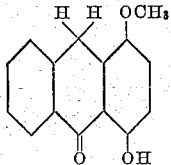

24 parts of the ether thus obtained are dissolved in 120 parts of pyridine and heated on the steam-bath with 23 parts of isatin-α-anilide. The formation of dyestuff soon sets in and is complete after a few hours. After cooling, the dyestuff is filtered by suction, washed with alcohol and water and dried. An indigolike dark-blue powder is obtained which is soluble in concentrated sulfuric acid to a green solution, insoluble in water and in low boiling solvents and soluble in hot nitrobenzene to a greenish-blue solution. With alkaline hydrosulfite the dyestuff gives an orange colored vat with which cotton and wool are dyed greenish-blue tints. The dyestuff probably has the following constitution:

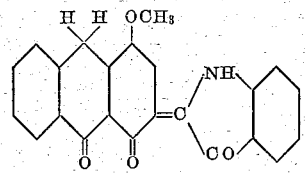

(2) By substituting for the quantity of methanol employed in Example (1) 300 parts of ethyl alcohol and otherwise proceeding as indicated in Example (1), the corresponding monoethylether of the 1.4-dihydroxy-anthrone is obtained in the form of yellow needles melting at 145° C.–146° C. The ether probably has the following constitution:

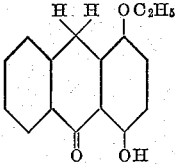

If 25 parts of this ether are heated to boiling with 30 parts of 5-chlorizatin-α-parachloranilide in 200 parts of acetic anhydride, a dyestuff is obtained which as regards its qualities is very similar to the product of Example (1). The dyestuff probably has the following constitution:

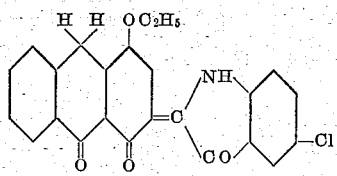

(3) 30 parts of 5.8 dichloro-1-hydroxy-4-acetoxy-10-anthrone of the formula:

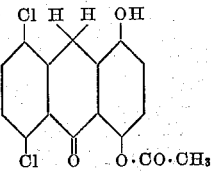

(obtainable by reduction of diacetyl-5.8-dichlorquinizarine) are heated to boiling with ten times their weight of methanol and 50 parts of concentrated hydrochloric acid until the starting material has disappeared and the reaction product has separated. It probably has the following constitution:

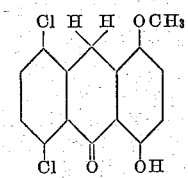

31 parts of this dichlorether are condensed in the usual manner with 25 parts of isatin-α-anilide in pyridine. A dyestuff is obtained which produces on the fiber intense green tints of very good fastness properties. The dyestuff probably has the following constitution:

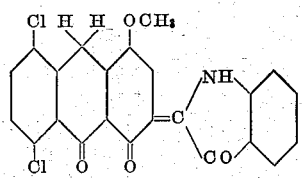

It dissolves in concentrated sulfuric acid to an olive green and in hot nitrobenzene to a bluish-green solution.

I claim:

1. The process which comprises treating a compound of the following general formula:

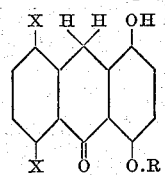

wherein R stands for hydrogen or an acetyl group and X for hydrogen or chlorine with an aliphatic alcohol in the presence of a mineral acid and causing the products, thus obtained, which have the following general formula:

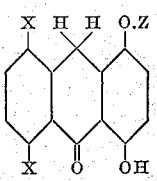

wherein X stands for hydrogen or chlorine and Z for alkyl to condense with an isatin-α-anilide.

2. The process which comprises treating a compound of the following general formula:

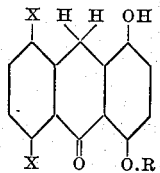

wherein R stands for an acetyl group and X for hydrogen or chlorine with an aliphatic alcohol in the presence of a mineral acid and causing the products, thus obtained, which have the following general formula:

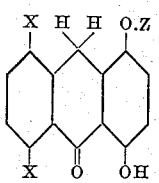

wherein X stands for hydrogen or chlorine and Z for methyl or ethyl to condense with an isatin-α-anilide.

3. The process which comprises treating a compound of the following general formula:

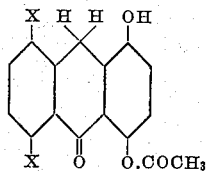

wherein X stands for hydrogen or chlorine with methyl alcohol in the presence of a mineral acid and causing the products, thus obtained, which have the following general formula:

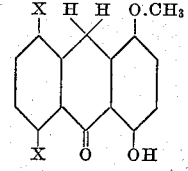

wherein X stands for hydrogen or chlorine to condense with an isatin-α-anilide.

4. The process which comprises treating 5.8 dichloro-1-hydroxy-4-acetoxy-10-anthrone with methyl alcohol in the presence of concentrated hydrochloric acid and causing the 5.8 dichloro-1-methoxy-4 hydroxy-10-anthrone, thus obtained, to condense with isatin-α-anilide.

5. As new products, compounds of the following general formula:

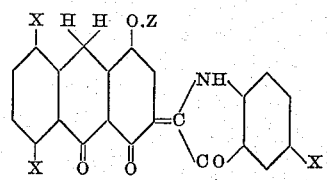

wherein X stands for hydrogen or chlorine and Z for methyl or ethyl being vat dyestuffs of very good fastness properties.

6. As new products, compounds of the following general formula:

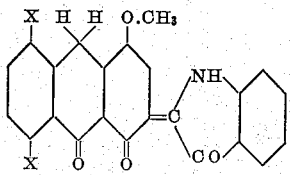

wherein X stands for hydrogen or chlorine being vat dyestuff of very good fastness properties.

7. As a new product, the compound of the following formula:

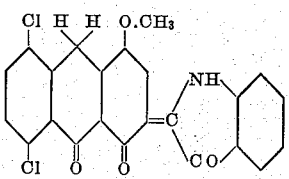

being a vat dyestuff which dissolves in concentrated sulfuric acid to an olive green solution and in hot nitrobenzene to a bluish-green solution and dyes the fiber intense green tints of very good fastness properties.

8. As a new product, the compound of the following formula:

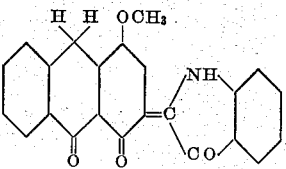

being a vat dyestuff which is soluble in concentrated sulfuric acid to a green solution and in hot nitrobenzene to a greenish-blue solution and gives an orange colored vat from which cotton and wool are dyed greenish-blue tints.

9. As a new product, the compound of the following formula:

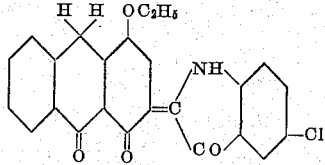

being a vat dyestuff which is soluble in concentrated sulfuric acid to a green solution and in hot nitrobenzene to a greenish-blue solution and gives an orange colored vat from which cotton and wool are dyed greenish-blue tints.

In testimony whereof, I affix my signature.

KARL ZAHN.